United States Patent [19]

Freeman et al.

[11] Patent Number: 4,752,997

[45] Date of Patent: Jun. 28, 1988

[54] PROCESS OF REPAIRING A MULTI-WIRE ELECTRICAL CABLE

[76] Inventors: Clarence S. Freeman; Katherine M. Freeman, both of 16242 Katherin La., Channelview, Tex. 77530

[21] Appl. No.: 939,007

[22] Filed: Dec. 8, 1986

Related U.S. Application Data

[63] Continuation-in-part of Ser. No. 844144, Mar. 26, 1986.

[51] Int. Cl.$^4$ .............................................. H01R 43/00
[52] U.S. Cl. .................................. 29/402.18; 29/527.2
[58] Field of Search ...................... 29/402.18, 527.2; 427/12, 27, 30, 62, 117

[56] References Cited

U.S. PATENT DOCUMENTS

| | | |
|---|---|---|
| 3,403,089 | 9/1968 | Joyce . |
| 3,661,358 | 5/1972 | Dill ..................................... 254/134.3 |
| 3,893,962 | 7/1975 | Walton et al. ...................... 260/28.5 |
| 3,939,882 | 2/1976 | Gillemot . |
| 4,002,819 | 1/1977 | Woytiuk ................................ 174/23 |
| 4,129,544 | 12/1978 | Craig . |
| 4,238,638 | 12/1980 | Cretney et al. ........................ 174/23 |
| 4,308,416 | 12/1981 | Herman et al. ........................ 174/23 |

FOREIGN PATENT DOCUMENTS

| | | |
|---|---|---|
| 2250042 | 5/1974 | Fed. Rep. of Germany . |
| 1473753 | 3/1967 | France . |
| 1146613 | 3/1969 | United Kingdom . |
| 2038111A | 7/1980 | United Kingdom . |

Primary Examiner—Timothy V. Eley
Attorney, Agent, or Firm—Vaden, Eickenroht, Thompson & Boulware

[57] ABSTRACT

A procedure for drying cables having multiple pairs of insulated wires therein by using a compound comprising a mixture of polymer granules and granules of a lubricating and bond-breaking substance. The polymer granules are swellable and with respect to water and do not electrochemically heat in the presence of water. They encapsulate the water leaving the insulation material unaffected except for being dried. The principal polymer used is a salts of carboxylate. Further, a technique is disclosed for coating or insulation grafting a metallic cationic wire wherein the wire is placed in water in the presence of salts of carboxylate or other appropriate polymers having anionic groups together with a cationic substance, such as lithium. A dc current is then introduced to establish the wires as an anode. By electrolysis action there is established a hydrophobic coating having a polymer-anionic-to-metal-cationic bond with the metal. The procedure of introducing salts of appropriate anionic polymers and cationic substances where there is an insulation break and short between the wires, providing moisture or standing water and a small dc current has been found useful in repairing such breaks by the formation of an electrochemical coating on the exposed anode wire.

6 Claims, 1 Drawing Sheet

PROCESS OF REPAIRING A MULTI-WIRE ELECTRICAL CABLE

This application is a continuation-in-part of my co-pending patent application Ser. No. 06/844,144, filed Mar. 26, 1986.

BACKGROUND OF THE INVENTION

1. Field of the Invention

This invention pertains to the maintenance of multi-wire cables, such as telephone cables, and more specifically to apparatus suitable for restoring such cables to operating service following water damage.

In one aspect, this invention pertains in part to the treating of wires intended for carrying electrical current in such a manner so as to repair insulated wires that have become bare so as to restore such wires to service and so as to protect them against further electrical shorts caused by water.

2. Description of the Prior Art

Telephone cables normally comprise a large plurality of wires. Each wire is routinely individually insulated by a paper or plastic coating. Paper coatings are either paper wrapped coatings or paper cellulose extruded coatings. These individually insulated wires in pairs and sometimes in greater number are then further insulated by being wrapped in paper or otherwise to form a second layer of insulation. Finally, the double insulated wires are then enclosed in a plastic or lead jacket or sheath. An insulating gel is often pressure forced into the end of the cable to help form a moisture barrier.

In use, the wires, through switching equipment and the like, are connected in their respective pairs to one or more small dc power sources to provide the transmission current that is required and eventually to the telephone terminal equipment, namely, one or more telephone transmitters at one end or location and one or more telephone receivers at the other end.

In spite of all of the insulation protection afforded, as noted above, nevertheless, all too often, moisture does get into the cable and into the porous intrusions or even breaks in the insulation and causes a conductive path through the moisture from wire to wire. When this happens, the wires either short out altogether or crosstalk is established, thereby disrupting the telephone communications.

In order to dry the wires and correct a short or partial short, the section of cable where the problem occurred must first be isolated. The wires are then exposed, a silica gel is sprinkled into the area and a blow dryer is used to finish the drying. The silica gel electrochemically reacts with the water to heat the area and thereby accelerates the drying process by evaporation. After the moisture is removed, the exposed or bare wires are then rewrapped or spliced and the cable resealed. All of the above is time-consuming and expensive.

Moreover, in addition, it is also well-known that once a problem occurs in a cable section and remedied in the above manner, the problem will likely reoccur in the same area. It is believed that this reoccurrence results because of the abrasive nature of the silica gel and because the paper insulation become brittle, non-flexible, and flaky. Plastic coatings also become brittle and sometimes melt or partly melt either by the heat or by being dissolved. Leaving some abrasive particles in place causes the restored insulation to wear to reexpose the metal wire and permit moisture again to cause shorts.

Therefore, the standard procedures for repairing a water-damaged cable does not leave the cable in comparable pre-damaged condition. The repaired sections are weakened sections. To avoid putting weakened sections into service, whole lengths of damaged cables have to be removed. That is, drying and repairing of a previously damaged cable section is not enough. Current drying methods are so harsh that the only successful remedy is to determine where the water damage started and ended and replace the entire cable section or sections therebetween. The replacement of previously wetted sections can be extremely expensive.

Now referring to the prior art technique employed to allegedly protect cables from water migration within a cable where water has made a penetration, U.S. Pat. No. 4,308,416 to Herman, et al. describes the use of waterswellable, water-insoluble polymers in the cable or alternatively in the insulation paper to block water penetration and movement within the cable without resulting in cable breakage as a result of polymer swelling. Suitable polymers for this purpose are prepared by crosslinking an olefinically-unsaturated carboxylic acid with an alkyl acrylate and supplied in amounts of 1% to 10% of the void volume of the cable, preferably 2% to 6% of the void volume. Nevertheless, water leakage in the cable that cannot be absorbed will still cause a short to occur through any intrusion or break in the insulation.

Herman, et al. does not suggest the use of his polymers for the purpose of repairing or drying previously water-damaged cables.

It should be further noted that there is not enough polymer supplied to the affected area according to the Herman, et al. technique to cause electrochemical insulation protection to occur. Herman, et al. polymers are present to absorb some moisture and to cause some swelling to block moisture migration. However, the amount of polymer is limited by the constraints of cable size. If any more polymer were used than that taught by Herman, et al., cable breakage would result.

Therefore, it is a feature of the present invention to provide an improved apparatus and method using such apparatus for drying water-exposed electrical cable wires that does not cause electrochemical drying and that is not abrasive.

It is another feature of the present invention to provide an improved method of repairing cable wires after a short has occurred that leaves the repaired area better protected against future shorts form occurring than an unrepaired area.

It is yet another feature of the present invention to provide in one aspect thereof an improved process for protectively electrochemically coating a bare wire so that even in the presence of intrusions or breaks in the normal insulation of the wire, shorts will not occur between that wire and another wire in the cable.

SUMMARY OF THE INVENTION

The basic process for drying a water exposed cable section including a plurality of paper or plastic insulated wires utilizes the use of polymer granules of super absorbent salts and/or mixed salts together with an appropriate quantity of granules of nonsilica talc or other appropriate lubricant and bond-breaking substance. Such polymer granules encapsulate the water without chemical reaction, swelling up as it does so, thereby removing the water without embrittling or otherwise affecting the paper or plastic insulation around the wires. Moreover, the talc acts as a lubricant that permits the granules to be worked within the wetted interstices of the wires without attaching to the insulation or being abrasive. The granules are not sticky and do not bond or electrically bridge between wires. In this sense, the talc granules also act as "bond-breakers", which permits the entire mixture of polymer and talc granules to be readily subsequently shaken out of an affected area after it is dry and ready to be restored to service.

Another aspect of the process of treating an affected area is that exposed wire surfaces are electrochemically treated or coated by the use of such super absorbent, water insoluble and/or mixed salts of polymers, which also have terminal anions attached to the backbone of the polymer. For this purpose, the polymers also include one or more noninvolved cationic substances. The polymers and the metallic wire to be protectively coated having a cationic disposition, such as a common copper wire, are all assumed to be in the presence of water or at least in a moisture environment. When a small dc current is applied to the water in a direction so that the wire becomes an anode, this produces an anionic-cationic electrochemical cross-linking between the polymer and the metal of the wire and results in an hydrophobic coating or insulation graft to the wire.

When the above described invention is employed in repairing a break in the insulation of wires within a cable, a combination of the polymers in granular form and in sufficient quantity to establish the coating are sprinkled onto the wires where the insulation break or intrusion is located. Moisture is left present or even added to the area and a small dc electrical current is established. The normal telephone current is sufficient. If the short is metered, it will be readily apparent when the insulation has been established to the anode wire, namely, when the meter shows that there is no longer a short across the wires. This action, by experience, takes about seven minutes to begin to occur.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary embodiment thereto which is illustrated in the drawings, which drawings form a part of this specification. It is to be noted, however, that the appended drawings illustrate only a typical preferred embodiment of the invention and are not to be considered limiting of its scope as the invention may admit to other equally effective embodiments.

In the Drawings.

DESCRIPTION OF THE PREFERRED EMBODIMENTS

Figure 1:
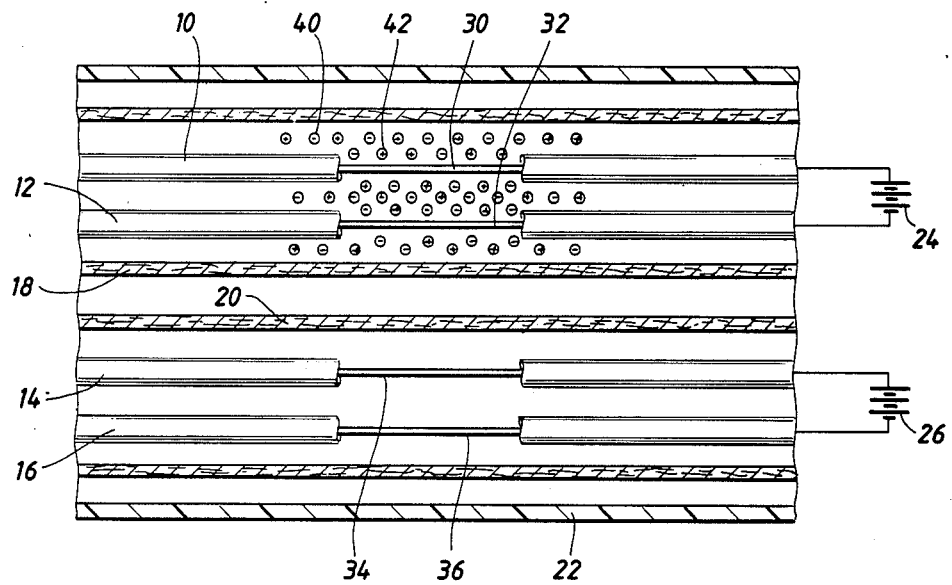
FIG. 1 is a cross-sectional and magnified view of a cable structure suitable for describing the present invention.

Now referring to the drawings, and first to FIG. 1, an exemplary simplified telephone cable section is illustrated. The section comprises a plurality of pairs of individually insulated wires such as first pair 10 and 12 and second pair 14 and 16. The individual insulation for those wires can either be paper or plastic. The conductive wire is typically copper, although the invention is applicable to wires made of other kinds of metal. Wires 10 and 12 along with a plurality of other wires not shown in the drawing are bundled or wrapped together with insulation paper 18. In similar fashion, wires 14 and 16 along with a plurality of other wires not shown can be separately bundled or wrapped together with insulation 20, although more often than not all of insulated wires 10, 12, 14 and 16 are bundled together in one common second insulation 18 or 20. Subsequently, all of the double insulated wires are then enclosed in cable jacket or sheath 22.

In actual practice, there are usually many more than two pairs of wire in cable and more than a single pair can be wrapped together with insulation papers.

Assuming that the insulation is in perfect condition and that there has been no physical damage to the cable, when the cable is submerged for any length of time in water, it is highly likely that there will be water intrusion into the cable and this intrusion will cause shorting of the wires and loss of service. When this occurs, the affected cable section or sections must be isolated and restored to service by replacement or repair procedures.

Described hereafter are super absorbent polymer salts and/or mixed salts, e.g., salts of carboxylate, that are particularly well-suited for cable drying purposes without causing any lasting damage to the insulation. It is a key property or characteristic of these products that they absorb water without entering into any heating-producing chemical reaction. That is, they act like a sponge, but unlike a sponge, they do not give up the encapsulated or trapped water by being squeezed. They do, of course, swell up with the entrapped water.

For cable drying purposes, such products are reduced to fine granule form and mixed with a quantity of granules of a non-silica talc, such talc acting as both a lubricant and a bond-breaker, as will be described hereafter. The preferred granular size for the polymer salts and/or mixed salts is 50 to 150 mesh. The talc granules are much finer. The ratio by volume of polymer salts and/or mixed salts to talc is about 10 percent to 30 percent talc.

In using the product, the "wet" section cable is isolated and split open to reveal the individually insulated wires. The polymer salts granule and talc granule mixture is then sprinkled into the opening to cover the wetted area. The individual wires are carefully separated without tearing the insulation so that the granules have an opportunity to work within the interstices between the wires.

If the outer jacket of the cable had to be completely removed, then a blanket or undercovering can be placed under the wires, or the undercovering can be loosely wrapped around the wires, to prevent an excessive amount of the granules to work all the way through. The main point of the procedure is to completely cover the wetted area so that the granules stay in contact with the area for several minutes.

When the wires are carefully separated, as mentioned above, the lubrication property of the talc cause this to be done remarkably easily without tearing the insulation.

After several minutes, 7-20 minutes depending on how wet the area was to begin with, the granules can be shaken out of the repaired section of cable. The granuleand-talc mix is not sticky and therefore does not adhere to the wires. The polymer granules, of course, are larger than they were to begin with by the amount of water encapsulated by each such granule. There is no problem with granules left in place because of stickness that might otherwise electrically establish short-inducing bridging between wires. Hence, the presence of the talc prevents bonding or acts as a "bond-breaker". A blower or a soft brush can be used to remove any granules that might otherwise lodge in between the wires.

It should be noted that since the insulation is not heated, it does not become brittle or subject to cracking or pealing or flaking. The insulation, whether it is paper insulation or plastic insulation, is restored substantially to its pre-wetted condition. The jacket of the restored area can then be resealed or replaced in accordance with well-known procedures.

Non-silica talc has been referred to as the preferred bond-breaker and lubricant ingredient to mix with the polymer salts or mixed salts; however, inorganic clays can also be used for this purpose. Clays are not as good in their lubricating properties and are occasionally abrasive, making them less attractive for use when the insulation paper is particularly fragile because of heavy wetting.

Now returning to FIG. 1, operationally a small dc current is applied to each pair when the cable is in service. This is shown in FIG. 1 by battery 24 being connected to wires 10 and 12 and by battery 26 being connected to wires 14 and 16.

In the above discussion it was assumed that there were no intrusions in the wires other than caused by the insulating materials naturally absorbing water or by being inherently porous thereby permitting water passage. However, there are worse conditions that are encountered. One or more of the wires can be exposed because of insulation defects. An intrusion or break in the insulation surrounding an individual wire can be caused by bending or stretching the cable, wear in the insulation, impact on the cable, or otherwise. The intrusion can be very small, such as one or more porous or pin-hole breaks, or can be a major separation in the insulation. For illustration purposes only, the breaks are shown by bare wire segments 30, 32, 34 and 36, respectively, appearing in wires 10, 12 14 and 16. Where there is an electrical path between the two wires in a pair, a short is established therebetween. It should be noted that this may be a direct contact between two bare wires. However, a short is more commonly the result of moisture being present in the cable to cause the path. Moreover, the breaks in the insulation of the two wires in a pair do not and are often not opposite one another, but longitudinally are displaced some distance apart.

Figure 2:
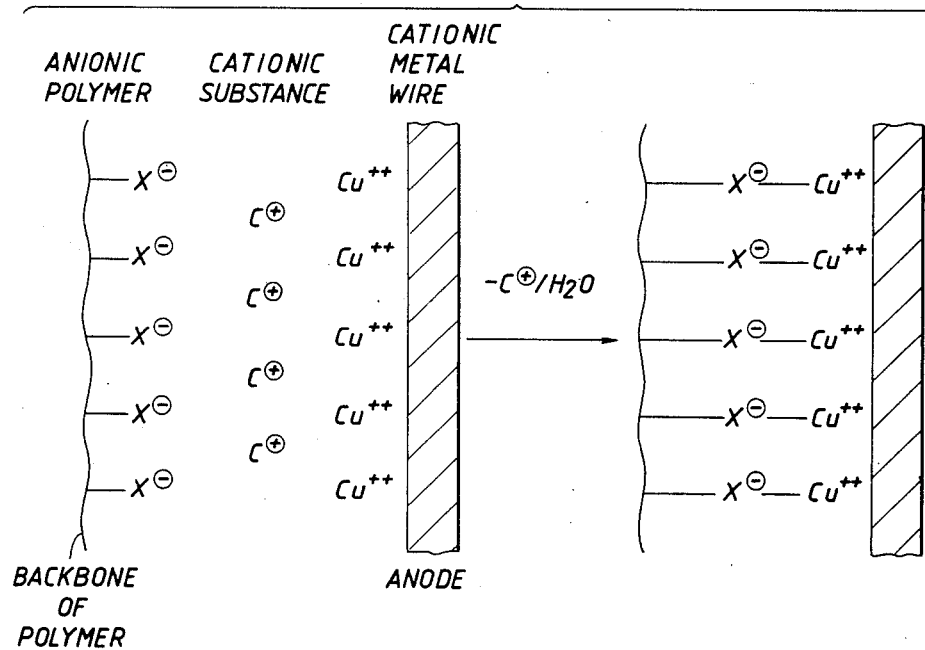
FIG. 2 is an explanatory diagram of the electrochemical cross-linkage action that produces the hydrophobic coating on a wire in accordance with the present invention.

Now referring to FIG. 2, an illustration of the electrochemical reaction in accordance with the one aspect of the present invention is diagrammed. A potentially cationic wire, such as copper, is shown in the presence of water with a carboxylate or other appropriate polymer having a terminal anion connected to the backbone of the polymer. Also present in the polymer are one or more separate and noninvolved cationic substances. That is, this substance is present in the polymer, but does not chemically link with the anionic polymer.

In the presence of a small dc current wherein the illustrated wire becomes an electrical anode, the separate substances remain in solution with the water and there is established a hard crosslinkage between the anion attached to the backbone of the polymer and the terminal cation chelated on the surface of the metal wire. That is, under conditions of electrolysis caused by moisture and current, the metal wire produces cations on the surface of the anode. These cations are chelated by an anionic group on a polymer chain such as a carboxylate group. The polymer and chelated chain then contacts the metal wire, whereupon the chelated cations are replaced by a metal ion on the surface of the wire to produce a coating of metal-cation-to-carboxylate-anion polymer which binds or grafts to the metal surface. This electrolytic deposition of material is similar to that which is involved in a galvanizing process. The insulation thus developed excludes water and thus insulates the metallic surface against further electrolysis, oxidation and corrosion. In other words, this crosslinkage of the anionic polymer to the wire establishes a hydrophobic coating of the wire that is water repellent and therefore prevents the establishment of an electrical path or short between separate wires.

Many polymers have been investigated that end with a suitable terminal anion, such as the carboxylate group mentioned above. Additional polymer groups that have suitable anion characteristics are sulfate, phosphate and sulfonate. Wires having a suitable cationic disposition includes wires made of aluminum, nickel, cobalt, chromium, and iron, in addition to wires made of copper. Cationic substances that have the effect of encouraging the electrochemical crosslinkage described above, while not entering into chemical linking themselves, include lithium, sodium, potassium, magnesium, calcium, strontium, barium, aluminum, and zinc. It should be noted that some of these substances having a single positive (cationic) charge, others have a double charge and one even has a triple charge. In order for the coating to occur, one or more of the substances has to be present in the polymer.

More specifically, super absorbent, salts and/or mixed salts (for example, the alkai metal ions: lithium, $Li^+$; sodium, $Na^+$; potassium, $K^+$; or the alkaline earth metal ions: magnesium, $Mg^{++}$; calcium, $Ca^{++}$; strontium, $Sr^{++}$; barium, $Ba^{++}$; zinc, $Zn^{++}$; aluminum, $Al^{+++}$) of cross-linked carboxylate (having a terminal anion structure $-CO_2^-$) polymers and/or co-polymers (for example, covalently cross-linked anionic polyelectrolytes from acrylate, acrylamide, methacrylate, methacrylamide, acrylonitrile, methacrylonitrile, tri- and/or tetraethyleneglycol diacrylate, cellulose or cellulose derivatives) act as corrosion or oxidation inhibitors for the surface of various metallic "M" substances (for example, copper Cu; nickel, Ni; cobalt, Co; aluminum Al; iron, Fe) under conditions of electrolysis caused by moisture or water. Under conditions of electrolysis caused by moisture or water these metals M produce cations ($M^{++}$ or $M^{+++}$) on the surface of the anode. These cations are then chelated by the polymeric carboxylate groups and the carboxylate polymers are cross-linked to produce a coating or graft of a metal-cation-to-carboxylate-anion polymer which binds to the metallic surface, thereby excluding water or moisture and thus insulates the metallic surface against further electrolysis, oxidation and/or corrosion.

It has been noted that when all of the linkage that can occur has occurred and the wire is completely coated, the electrolysis migration and cross-linkage action stops In a field situation, the invention for coating wire in the manner just described can be employed to repair insulation breaks. After it has been determined that there has been an insulation break in the presence of moisture or water that has caused a short, it is possible to repair the break by first isolating the break using techniques well known in the art. The wires are then separated and salts of carboxylate or other appropriate polymers 40 (FIG. 1) with salts or granules of a cationic substance 42 also present are sprinkled into the area to cover the bare wires. Preferably, a non-silica talc is mixed therewith, as described in the above procedure for use with wires that are assumed not to have any insulation breaks at all. Moisture is not removed but, in fact, if not sufficient, is added so that there is a definite short present between the pair of wires at such break. Low dc current is applied, which can merely be the existing telephone current, to establish the electrolysis migration in the manner discussed above, which causes water to be moved away from the anode wire and therefore accelerates drying of the area. Shortly, the anode wire of the pair will be electrochemically coated and the current through the short path will stop. It is convenient to meter such action so that it can be determined when the short no longer exists. The added mixture can then be removed, also removing therewith the encapsulated water. The cable can then be closed and resealed in conventional fashion.

It should be noted that there is no scraping and baring of wire by mechanical means, which would weaken the strength of the wire. The polymers used in the process also are not abrasive.

Hence, in the final analysis, it does not make any difference as to whether there are major insulation defects or not if there is current present. If there are defects, these will be "cured". If there are no defects, the area will still be dried out without damage to the insulation.

In many situations, however, there will be no major defects and the power will be shut off while the repair act is proceeding. In such cases drying of the area without current being present is still done in a manner preferred to that in the prior art as described above, without injury to the insulation and the need for either reinsulating large numbers of wires or expensively replacing entire cable lengths. Hence, if current is present, the service to the wires is restored in about seven minutes. This is because of the drying effect of the cations moving or forcing water molecules away from the anode wires and because of the insulation coating that occurs, as described above. If no current is present, the area is dried in any event in about 10–20 minutes.

While several embodiments have been described and a simplified embodiment illustrated, it will be understood that the invention is not limited thereto, since many modifications may be made and will become apparent to those skilled in the art.

What is claimed is:

1. The process of repairing a multi-wire electrical cable to service following exposure to water that disrupts normal electrical service provided by the cable as a result of water-bridging, the wires of the cable being internally insulated from each other inside the cable, which comprises
   opening the outer covering of the cable to access the wires of the cable exposed to the water,
   distributing granules of a water-swellable polymer mixed with granules of a lubricating and bond-breaking substance into the interstices of the accessed wires for a sufficient length of time to dry the insulation in the accessed area, said polymer granules encapsulating the absorbed water,
   said polymer granules causing no electrochemical heating,
   removing said polymer granules with the encapsulated water from the accessed area, and
   restoring the outer covering of the cable.

2. The process of repairing a cable in accordance with claim 1, wherein the polymer of the polymer granules is selected from the group consisting of a polymer having attached carboxylate groups, a polymer having attached sulfate groups, a polymer having attached phosphate groups, and a polymer having attached sulfonate groups.

3. The process of repairing a cable in accordance with claim 2, wherein the approximate size of said polymer granules is 50 to 150 mesh.

4. The process of repairing a cable in accordance with claim 1, wherein the lubricating and bond-breaking substance in non-silica talc.

5. The process of repairing a cable in accordance with claim 1, wherein the lubricating and bond-breaking substance is clay.

6. The process of repairing a cable in accordance with claim 1, wherein the ratio of polymer granules to granules of lubricating and bond-breaking substance is 70 percent to 90 percent by volume.

* * * * *